United States Patent
Reybrouck et al.

(10) Patent No.: US 7,070,028 B2
(45) Date of Patent: Jul. 4, 2006

(54) FREQUENCY DEPENDENT DAMPER

(75) Inventors: Koenraad Reybrouck, Brussels (BE); Luc Lemmens, Genk (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 09/778,455

(22) Filed: Feb. 7, 2001

(65) Prior Publication Data

US 2002/0104724 A1    Aug. 8, 2002

(51) Int. Cl.
    *F16F 9/00*    (2006.01)
(52) U.S. Cl. .................. 188/313; 188/282.8; 188/283; 188/317
(58) Field of Classification Search ............. 188/282.5, 188/282.6, 283, 322.15, 322.22, 282.1, 282.8; 267/64.15, 64.11, 64.19, 64.23, 64.24, 64.27, 267/127, 64.25
See application file for complete search history.

(56) References Cited

U.S. PATENT DOCUMENTS

| | | | |
|---|---|---|---|
| 671,559 A | | 4/1901 | Lindstrom |
| 894,117 A | * | 7/1908 | Clark ........................ 267/64.24 |
| 1,494,135 A | * | 5/1924 | Robison ...................... 188/287 |
| 1,566,190 A | | 12/1925 | Finkhaus |
| 1,984,144 A | | 12/1934 | Laugaudin |
| 2,048,037 A | * | 7/1936 | Smith ......................... 188/281 |
| 2,078,364 A | | 4/1937 | Becker et al. |
| 2,173,574 A | * | 9/1939 | Binder et al. ................ 188/287 |
| 2,719,611 A | * | 10/1955 | Bourcier ..................... 188/314 |
| 2,920,882 A | | 1/1960 | Allinquant |
| 3,063,701 A | * | 11/1962 | Long ........................ 267/64.24 |
| 3,128,088 A | | 4/1964 | Paschakarnis |
| 3,169,758 A | | 2/1965 | Dillenburger |
| 3,171,643 A | | 3/1965 | Roos |
| 3,246,905 A | * | 4/1966 | Morgan ..................... 280/6.159 |
| 3,339,680 A | * | 9/1967 | Tuneblom ............... 188/322.14 |
| 3,391,922 A | * | 7/1968 | Axthammer ............. 267/64.17 |
| 3,399,882 A | * | 9/1968 | Hausmann ................... 267/292 |
| 3,444,830 A | * | 5/1969 | Doetsch ...................... 108/136 |
| 3,666,288 A | * | 5/1972 | Carton et al. ................ 280/683 |
| 3,706,362 A | | 12/1972 | Faure |
| 3,762,514 A | | 10/1973 | Freitag |
| 3,819,166 A | * | 6/1974 | Ellis et al. ................ 267/64.21 |

(Continued)

FOREIGN PATENT DOCUMENTS

BE    537 348    4/1959

(Continued)

OTHER PUBLICATIONS

European Search Report dated May 2, 2005.

*Primary Examiner*—James McClellan
*Assistant Examiner*—Mariano Sy
(74) *Attorney, Agent, or Firm*—Harness, Dickey & Pierce, PLC (57) ABSTRACT

A gas shock absorber has a pressure tube which defines a working chamber. A piston divides the working chamber into an upper working chamber and a lower working chamber. A flow path extends through the piston to provide fluid communication between the upper and lower working chambers. A valve body is attached to the pressure tube. The valve body defines a flow path between the working chamber and a fluid chamber. The fluid chamber is in communication with either the upper working chamber or the lower working chamber. The fluid chamber can be defined within the pressure tube, between the pressure tube and a chamber tube or it can be defined by an air spring assembly.

13 Claims, 5 Drawing Sheets

U.S. PATENT DOCUMENTS

| | | | | |
|---|---|---|---|---|
| 3,840,245 A | * | 10/1974 | Aikawa et al. | 267/64.19 |
| 3,897,940 A | * | 8/1975 | Gele | 267/64.16 |
| 3,909,035 A | * | 9/1975 | Aikawa | 267/64.19 |
| 4,030,715 A | | 6/1977 | Duran | |
| 4,045,008 A | | 8/1977 | Bauer | |
| 4,064,977 A | | 12/1977 | Taylor et al. | |
| 4,066,279 A | | 1/1978 | Kaptanis | |
| 4,110,888 A | * | 9/1978 | Mutou | 29/404 |
| 4,139,186 A | * | 2/1979 | Postema et al. | 188/322.19 |
| 4,156,523 A | | 5/1979 | Bauer | |
| 4,263,488 A | | 4/1981 | Freitag et al. | |
| 4,298,194 A | | 11/1981 | Marx | |
| 4,307,874 A | | 12/1981 | Reuschenbach et al. | |
| 4,307,875 A | | 12/1981 | Schnitzius et al. | |
| 4,316,098 A | | 2/1982 | Freitag et al. | |
| 4,325,541 A | * | 4/1982 | Korosladanyi et al. | 267/220 |
| 4,328,960 A | * | 5/1982 | Handke et al. | 267/226 |
| 4,356,898 A | | 11/1982 | Guzder et al. | |
| 4,407,396 A | * | 10/1983 | Sirven | 188/282.8 |
| 4,428,464 A | | 1/1984 | Miura et al. | |
| 4,445,673 A | * | 5/1984 | Clark | 188/282.7 |
| 4,460,074 A | | 7/1984 | Mueller et al. | |
| 4,478,387 A | | 10/1984 | Postema | |
| 4,497,394 A | | 2/1985 | Ferrand et al. | |
| 4,518,058 A | * | 5/1985 | Fister et al. | 180/300 |
| 4,582,304 A | * | 4/1986 | Reichert | 267/64.25 |
| 4,588,171 A | * | 5/1986 | Stephens | 267/64.24 |
| 4,624,346 A | | 11/1986 | Katz | |
| 4,678,203 A | * | 7/1987 | Rohner et al. | 267/64.21 |
| 4,718,647 A | | 1/1988 | Ludwig | |
| 4,736,824 A | | 4/1988 | Dony et al. | |
| 4,742,996 A | | 5/1988 | Gold | |
| 4,778,198 A | | 10/1988 | Gold | |
| 4,782,925 A | | 11/1988 | Grundei | |
| 4,791,712 A | * | 12/1988 | Wells et al. | 188/322.22 |
| 4,815,716 A | * | 3/1989 | Scotto | 267/64.16 |
| 4,844,428 A | * | 7/1989 | Margolis et al. | 188/318 |
| 4,905,799 A | | 3/1990 | Yamaoka et al. | |
| 4,934,491 A | | 6/1990 | Yamaoka et al. | |
| 4,934,667 A | | 6/1990 | Pees et al. | |
| 4,961,482 A | | 10/1990 | Pohlenz et al. | |
| 4,993,694 A | * | 2/1991 | Gandiglio et al. | 67/64.24 |
| 5,040,645 A | | 8/1991 | Volpel et al. | |
| 5,042,624 A | * | 8/1991 | Furuya et al. | 188/280 |
| 5,115,892 A | | 5/1992 | Yamaoka et al. | |
| 5,123,506 A | | 6/1992 | Sirven | |
| 5,129,635 A | * | 7/1992 | Holley | 188/322.17 |
| 5,154,263 A | | 10/1992 | Lizell et al. | |
| 5,285,877 A | * | 2/1994 | Bonenberger et al. | 188/314 |
| 5,458,219 A | * | 10/1995 | Anderson | 188/322.21 |
| 5,467,852 A | | 11/1995 | de Kock | |
| 5,518,225 A | * | 5/1996 | Gubitz | 267/64.24 |
| 5,535,862 A | | 7/1996 | Jentsch et al. | |
| 5,570,762 A | | 11/1996 | Jentsch et al. | |
| 5,579,874 A | | 12/1996 | Jeffries et al. | |
| 5,620,066 A | * | 4/1997 | Schuttler | 188/300 |
| 5,632,471 A | | 5/1997 | Pradel | |
| 5,662,046 A | * | 9/1997 | Wright et al. | 105/167 |
| 5,682,966 A | * | 11/1997 | Cabrerizo-Pariente | 188/269 |
| 5,738,191 A | * | 4/1998 | Forster | 188/318 |
| 5,860,665 A | * | 1/1999 | Giles | 267/64.11 |
| 6,109,400 A | * | 8/2000 | Ayyildiz et al. | 188/266.1 |
| 6,135,434 A | * | 10/2000 | Marking | 188/315 |
| 6,161,821 A | * | 12/2000 | Leno et al. | 188/322.19 |
| 6,234,461 B1 | * | 5/2001 | Bohm et al. | 267/123 |
| 6,318,523 B1 | | 11/2001 | Moradmand et al. | |
| 6,340,153 B1 | * | 1/2002 | Miesner | 188/316 |
| 6,390,457 B1 | * | 5/2002 | Roper | 267/119 |

FOREIGN PATENT DOCUMENTS

| | | |
|---|---|---|
| DE | 36 41 623 | 6/1987 |
| EP | 0 764 795 | 3/1997 |
| EP | 1 048 875 | 11/2000 |
| FR | 1 380 784 | 12/1964 |
| FR | 2 587 773 | 3/1987 |

* cited by examiner

FIG. 5

FREQUENCY DEPENDENT DAMPER

FIELD OF THE INVENTION

The present invention relates generally to dampers or shock absorbers adapted for use in a suspension system such as the suspension system used for automotive vehicles. More particularly, the present invention relates to a shock absorber which utilizes a gas rather than hydraulic fluid as the damping medium.

BACKGROUND OF THE INVENTION

Shock absorbers are used in conjunction with automotive suspension systems to absorb unwanted vibrations which occur during driving. To absorb these unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to the sprung portion of the vehicle through a piston rod which extends through the pressure tube. The piston divides the pressure tube into an upper working chamber and a lower working chamber both of which are typically filled with a hydraulic liquid. Because the piston is able, through valving, to limit the flow of the hydraulic fluid between the upper and lower working chambers when the shock absorber is compressed or extended, the shock absorber is able to produce a damping force which counteracts the vibration which would otherwise be transmitted from the unsprung portion of the vehicle to the sprung portion of the vehicle. In a dual tube shock absorber, a fluid reservoir or reserve chamber is defined between the lower working chamber and the reserve chamber to also produce a damping force which counteracts the vibrations which would otherwise be transmitted from the unsprung portion of the vehicle to the sprung portion of the vehicle.

Shock absorbers filled with hydraulic liquid have met with continuous success throughout the automotive industry. While meeting with success in the automotive industry, hydraulic liquid filled shock absorbers are not without their problems. One problem with these prior art shock absorbers is that they are not sensitive to the frequency of the vibrations. Complex systems have been developed to modify these liquid filled shock absorbers to provide a shock absorber that is relatively soft for high frequency vibrations while being relatively stiff for low frequency vibrations. Other problems associated with the prior art hydraulic liquid filled shock absorbers include the variability in their damping forces due to temperature changes of the hydraulic liquid. As the temperature of the hydraulic liquid changes, the viscosity of the liquid also changes which significantly affects the damping force characteristics of the liquid. In addition, any aeration of the hydraulic liquid during operation of the shock absorber adversely affects the operation of the damper due to the introduction of a compressible gas into a non-compressible liquid. Finally, the hydraulic liquid adds to the weight of the shock absorber as well as presenting environmental concerns regarding the use and disposal of a hydraulic liquid.

The continued development of shock absorbers has been directed towards shock absorbers which do not use a hydraulic liquid for their damping medium. The replacement of the hydraulic liquid medium with an environmentally friendly gas medium provides the opportunity to overcome some of the problems associated with the hydraulic fluid damping medium shock absorbers.

SUMMARY OF THE INVENTION

The present invention provides the art with a shock absorber that utilizes a gas, preferably air, as the damping medium. The use of the gas as the damping medium produces a frequency dependent damper or shock absorber which is significantly less sensitive to temperature when compared to hydraulic liquid dampers, is not adversely affected by aeration over time, is lower in weight and, especially when the gas is air, it is environmentally friendly due to the elimination of the hydraulic oil.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 6 is a side view, partially in cross-section, of a unique gas filled frequency dependent damper in accordance with another embodiment of the present invention.

DETAILED DESCRIPTION OF THE PREFERRED EMBODIMENTS

Figure 1:
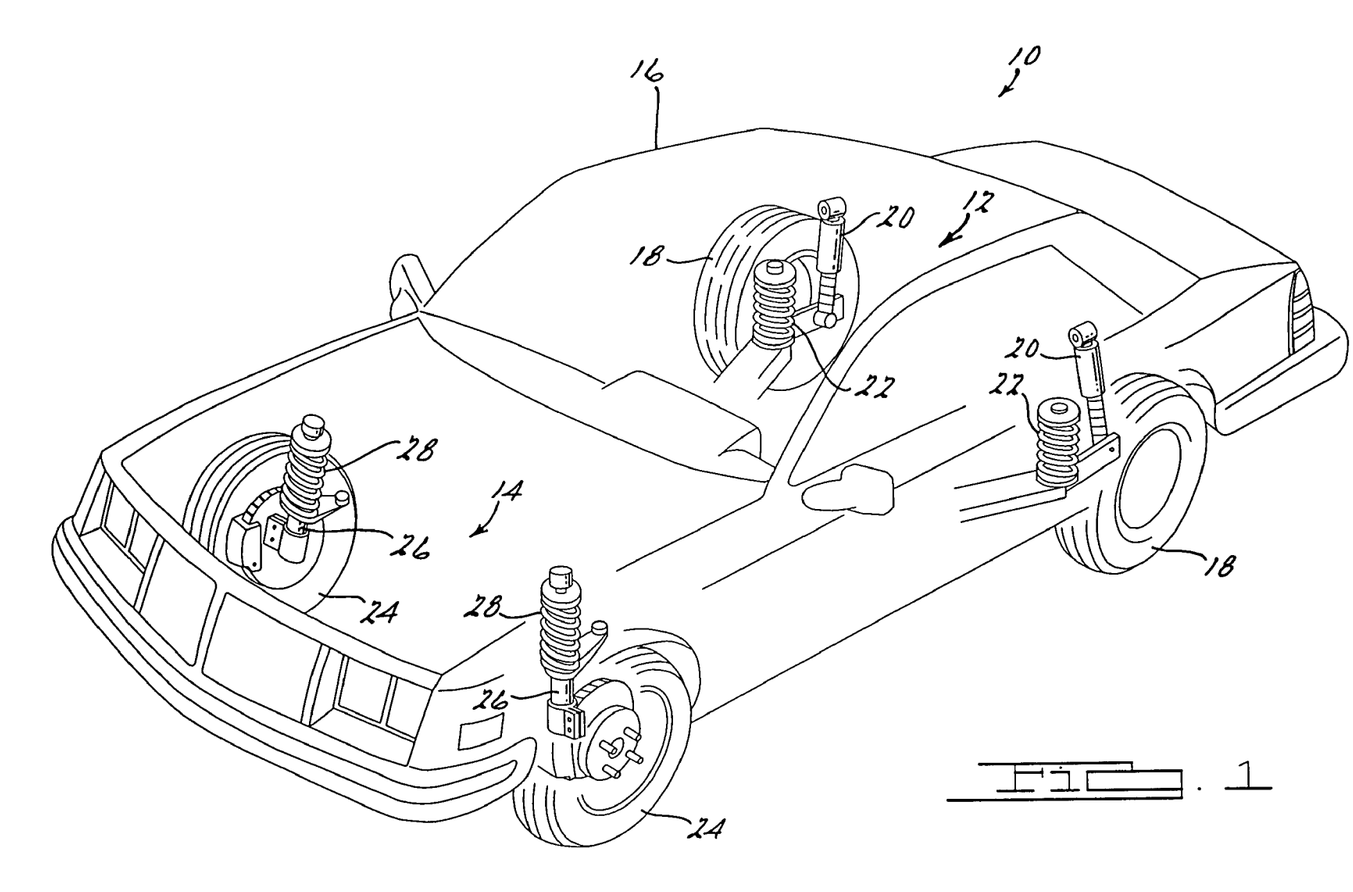
FIG. 1 is an illustration of an automobile incorporating the unique gas filled frequency dependent damper in accordance with the present invention.

Referring now to the drawings in which like reference numerals designate like or corresponding parts throughout the several views, there is shown in FIG. 1 a vehicle incorporating a suspension system having the frequency dependent dampers in accordance with the present invention and which is designated generally by the reference numeral 10. Vehicle 10 includes a rear suspension system 12, a front suspension system 14 and a body 16. Rear suspension system 12 includes a pair of independent suspensions adapted to operatively support a pair of rear wheels 18. Each rear independent suspension is attached to body 16 by means of a shock absorber 20 and a helical coil spring 22. Similarly, front suspension system 14 includes a pair of independent suspensions adapted to operatively support a pair of front wheels 24. Each independent front suspension is attached to body 16 by means of a shock absorber 26 and a helical coil spring 28. Rear shock absorbers 20 and front shock absorbers 26 serve to dampen the relative movement of the unsprung portion (i.e., front and rear suspension systems 12 and 14, respectively) of vehicle 10 with respect to the sprung portion (i.e., body 16) of vehicle 10. While vehicle 10 has been depicted as a passenger vehicle having independent front and rear suspensions, shock absorbers 20 and 26 may be incorporated into other types of vehicles having other types of suspensions and springs or into other types of applications, including, but not limited to, vehicles incorporating air springs, leaf springs, non-independent front and/or non-independent rear suspension systems. One of the unique features of the present invention is that if it is combined with an air spring, the air spring and the shock absorber can communicate with each other or the air spring and the shock absorber can be separate units. Further, the term "shock absorber" as used herein is meant to refer to dampers in general and thus will include MacPherson struts, spring seat units, as well as other shock absorber designs known in the art.

Figure 2:
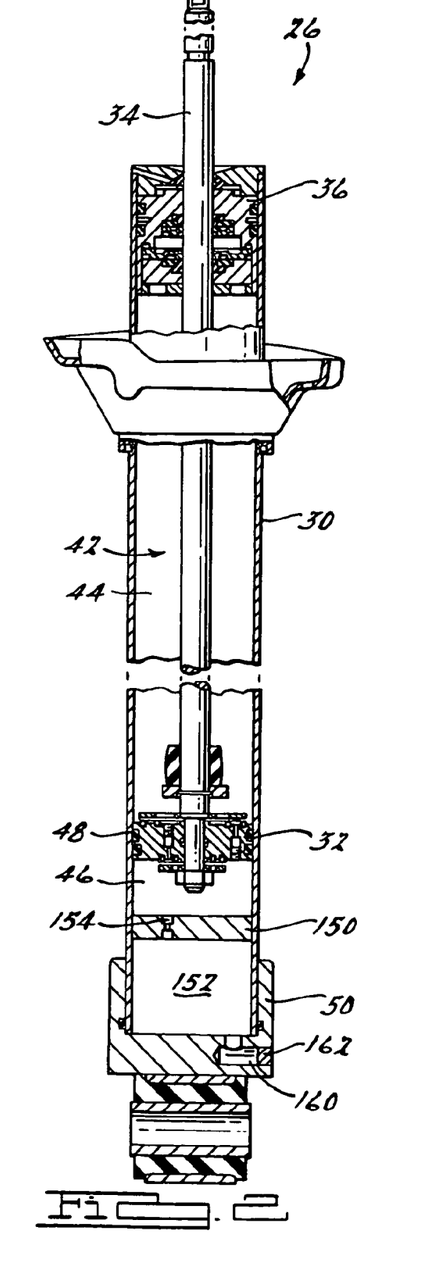
FIG. 2 is a side view, partially in cross-section, of the unique gas filled frequency damper in accordance with the present invention.

Referring now to FIG. 2, front shock absorber 26 is shown in greater detail. While FIG. 2 shows only shock absorber 26, it is to be understood that rear shock absorber 20 is or can be designed as a frequency dependent damper in accordance with the present invention. Rear shock absorber 20 would only differ from front shock absorber 26 in the way it is adapted to be connected to the sprung and unsprung portions of vehicle 10 and in the dimensions of the various components. Shock absorber 26 comprises a pressure tube 30, a piston assembly 32, a piston rod 34 and a rod guide assembly 36.

Pressure tube 30 defines a working chamber 42. Working chamber 42 is filled with a gas, preferably air, at a specified pressure to act as the damping medium. Piston assembly 32 is slidably disposed within working chamber 42 and divides working chamber 42 into an upper working chamber 44 and a lower working chamber 46. A seal assembly 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through rod guide assembly 36 which closes the upper end of pressure tube 30. The end of piston rod 34 opposite to piston assembly 32 is adapted to be secured to the sprung portion of vehicle 10. The end of pressure tube 30 opposite to rod guide assembly 36 is closed by an end cap 50 and end cap 50 is adapted to be connected to the unsprung portion of vehicle 10. While piston rod 34 is shown adapted for being connected to the sprung portion of vehicle 10 and end cap 50 is adapted for being connected to the sprung portion of vehicle 10, due to the use of a gas as the pressure medium, it is within the scope of the present invention to have piston rod 34 adapted to attach to the unsprung portion of vehicle 10 and end cap 50 adapted to attach to the sprung portion of vehicle 10 if desired.

Figure 3:
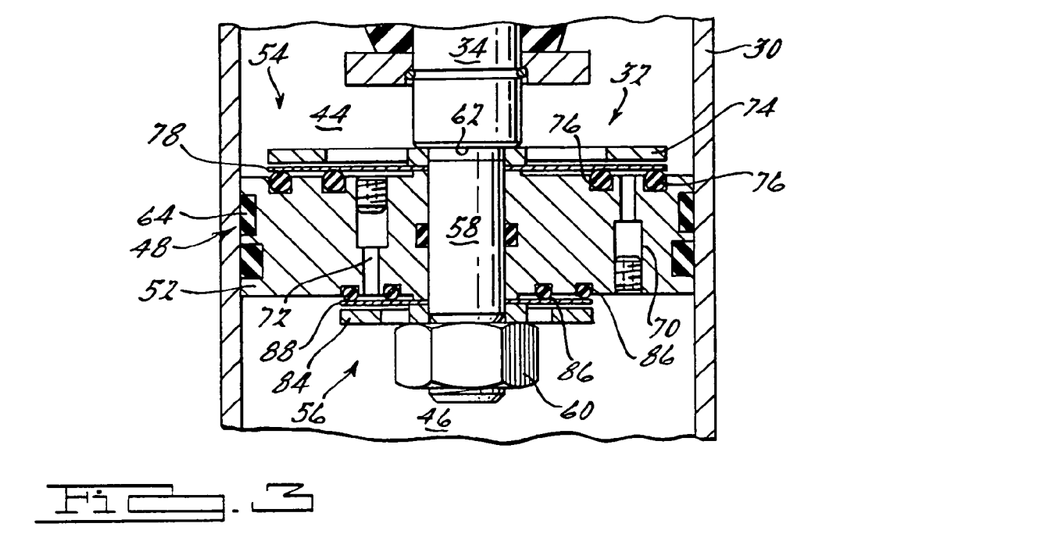
FIG. 3 is an enlarged cross-sectional view of the valving system incorporated into the piston assembly of the frequency dependent damper shown in FIG. 2.

Referring now to FIGS. 2 and 3, piston assembly 32 comprises a piston body 52, a compression valve assembly 54 and a rebound or extension valve assembly 56. Piston rod 34 defines a reduced diameter section 58 onto which compression valve assembly 54, piston body 52 and rebound valve assembly 56 are located. A nut 60 secures piston assembly 32 onto section 58 of piston rod 34 with compression valve assembly 54 abutting a shoulder 62 located on piston rod 34, piston body 52 abutting compression valve assembly 54, rebound valve assembly 56 abutting piston body 52 and nut 60 abutting rebound valve assembly 56 and threadingly engaging piston rod 34 to retain piston assembly 32 on piston rod 34.

Seal assembly 48 comprises a pair of annular seals located between piston body 52 and pressure tube 30. Seal assembly 48 is held in position by a plurality of grooves 64 formed in piston body 52. Seal assembly 48 permits sliding movement of piston body 52 with respect to pressure tube 30 without generating unique frictional forces as well as providing a seal between upper working chamber 44 and lower working chamber 46. This dual roll played by seal assembly 48 is extremely important for pneumatic shock absorber 26 due to the high pressures generated in working chambers 44 and 46 and the continued need for limiting the sliding forces generated between piston assembly 32 and pressure tube 30.

Piston body 52 defines a plurality of compression passages 70 and a plurality of extension passages 72. During a compression movement of shock absorber 26, gas flows between lower working chamber 46 and upper working chamber 44 through passages 70 as described below. During an extension movement of shock absorber 26, gas flows between upper working chamber 44 and lower working chamber 46 through passages 72 as described below.

Compression valve assembly 54 comprises a stop 74, a pair of annular seals 76 and a valve plate 78. Valve plate 78 is normally positioned against annular seals 76 to normally close the plurality of compression passages 70. During a compression stroke of shock absorber 26, the gas in lower working chamber 46 is compressed including the gas located within the plurality of compression passages 70. The compressed gas located within compression passages 70 exerts a force on valve plate 78 which will remain seated closing passages 70 until the force created by the gas pressure exceeds the bending stiffness of valve plate 78. When the load produced by the gas pressure exceeds the bending stiffness of valve plate 78, valve plate 78 will deflect away from seals 76 to allow gas flow from lower working chamber 46 to upper working chamber 44 through passages 70.

Extension valve assembly 56 comprises a valve stop 84, a pair of annular seals 86 and a valve plate 88. Valve plate 88 is normally positioned against seals 86 to normally close the plurality of extension passages 72. During an extension stroke of shock absorber 26, the gas in upper working chamber 44 is compressed including the gas located within the plurality of extension passages 72. The compressed gas located within extension passages 72 exerts a force on valve plate 88 which will remain seated closing passages 72 until the force created by the gas pressure exceeds the bending stiffness of valve plate 88. When the load produced by the gas pressure exceeds the bending stiffness of valve plate 88, valve plate 88 will deflect away from seals 86 to allow gas flow from upper working chamber 44 to lower working chamber 46 through passages 72.

Figure 4:
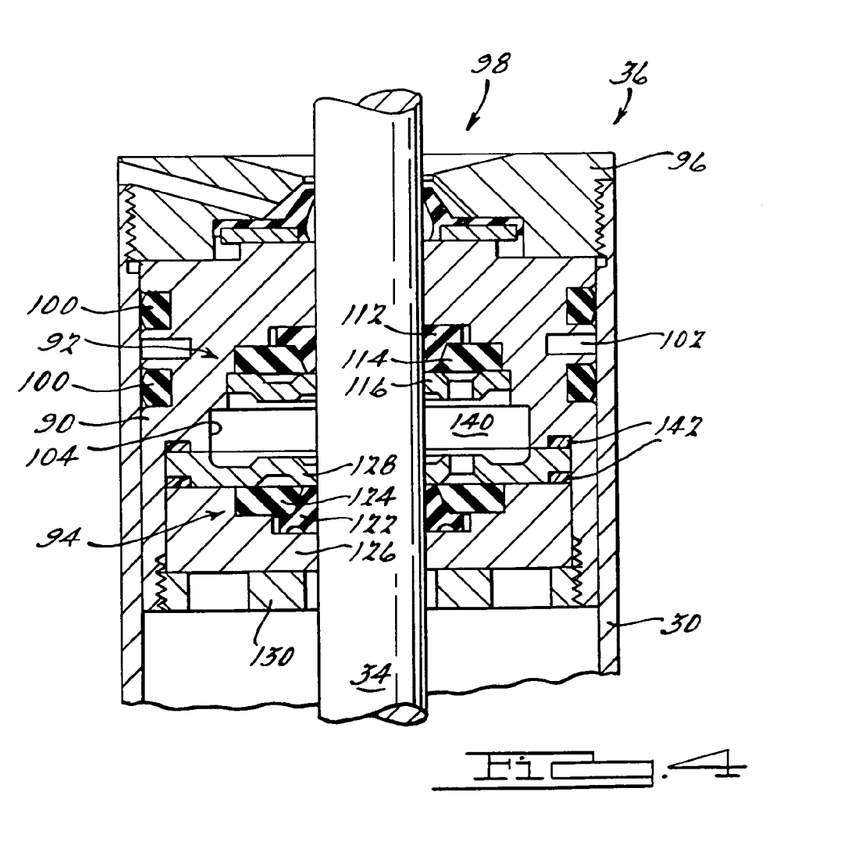
FIG. 4 is an enlarged cross-sectional view of the rod guide assembly of the frequency dependent damper shown in FIG. 2.

Referring now to FIGS. 2 and 4, rod guide assembly 36 provides both a sealing function for shock absorber 26 as well as a lubricating function. Rod guide assembly 36 comprises a main housing 90, an upper seal assembly 92, a lower seal assembly 94, a retainer 96 and a wiper seal 98. Main housing 90 is fit within pressure tube 30 with a pair of seals 100 sealing the interface between housing 90 and pressure tube 30. Retainer 96 secures main housing 90 within pressure tube 30. Wiper seal 98 is located between housing 90 and retainer 96 and acts to wipe foreign material off of piston rod 34 during the stroking of shock absorber 26. Housing 90 defines an external cavity 102 located between the pair of seals 100. External cavity 102 can be filled with oil to aid in the sealing between housing 90 and pressure tube 30. Housing 90 defines an internal cavity 104 within which upper seal assembly 92 and lower seal assembly 94 are located.

Upper seal assembly 92 comprises a dynamic seal 112 located between housing 90 and piston rod 34, a static seal 114 located between dynamic seal 112 and housing 90 and a retainer 116 attached to housing 90 to retain upper seal assembly 92 within cavity 104.

Lower seal assembly 94 is similar to upper seal assembly 92 and it comprises a dynamic seal 122, a static seal 124, a seal housing 126, a first retainer 128, and a second retainer 130. Dynamic seal 122 is located between seal housing 126 and piston rod 34. Static seal 124 is located between dynamic seal 122 and housing 126. First retainer 128 is attached to housing 90 to position lower seal assembly 94 within cavity 104. Second retainer 130 is attached to housing 90 to retain lower seal assembly within cavity 104.

Housing 90, upper seal assembly 92 and lower seal assembly 94 cooperate to form a chamber 140 within cavity 104 which is filled with lubricating oil to seal and lubricate the movement of piston rod 34 through rod guide assembly 36. A pair of seals 142 located between housing 90, housing 126 and first retainer 128 isolates chamber 140 from upper working chamber 44. During assembly of shock absorber 26, chamber 140 is filled with a specified amount of lubricant. Upper seal assembly 92 isolates chamber 140 from the outside environment and lower seal assembly 92 isolates chamber 140 from upper working chamber 44. Thus, the lubricant within chamber 140 of shock absorber 26 seals working chamber 42 to allow it to maintain its original gas charge while simultaneously providing lubrication for the movement of piston rod 34.

A valve body 150 is secured to pressure tube 30 such that axial motion with respect to pressure tube 30 is prohibited. Valve body 150 defines a gas chamber 152 located below valve body 150 and below lower working chamber 46. A tunable restriction 154 extends through valve body 150 to provide communication between lower working chamber 46 and gas chamber 152.

Gas filled shock absorber 26 described above provides a frequency dependent damper which can be tuned to specific performance requirements for specific applications. During compression and extension movements of a prior art liquid filled shock absorber, the liquid moves from either the lower working chamber to the upper working chamber or from the upper working chamber to the lower working chamber. This provides frequency versus dissipation response curves which continue to rise at an ever increasing rate as the frequency of the damped vibration increases leading to an exponential shaped curve at higher frequencies. The present invention provides the suspension system designer the opportunity to flatten the shape of this curve.

The flattening out of this curve is due to the compressibility of a gas versus the non-compressibility of a liquid. During low speed or low frequency movements of shock absorber 26, minimal compression of the gas occurs and movement of piston assembly 32 easily transfers gas between working chambers 44 and 46 of pressure tube 30. As the frequency of the movement increases, compression of the gas will also increase, changing the dissipation as the compressed gas begins to work like a gas spring. The specific point at which the gas shock curve bends away from the liquid shock curve can be tuned by selecting different sizes for passages 70 and 72 and different stiffnesses for valve plates 78 and 88. In addition to changing the shape of the frequency versus dissipation response curves, the height of the curve can also be tuned by changing the initial gas pressure within working chamber 42 as well as changing the axial position of valve body 150. The initial gas pressure within working chamber 42 is provided through a port 160 which is sealed with a plug 162 or sealed by any other means found in the art once the initial gas pressure within working chamber 42 is set.

The dual points of tunability for shock absorber 26 allows for tuning shock absorber 26 to both the lower car body natural frequencies (1–5 Hz) as well as the higher wheel hop natural frequencies (10–20 Hz) to optimize performance of shock absorber 26 at both of these frequencies. The prior art liquid shock absorbers could be tuned to one specific frequency but the remaining frequency responses were a result of the shape of the curve which could not be altered.

Figure 5:
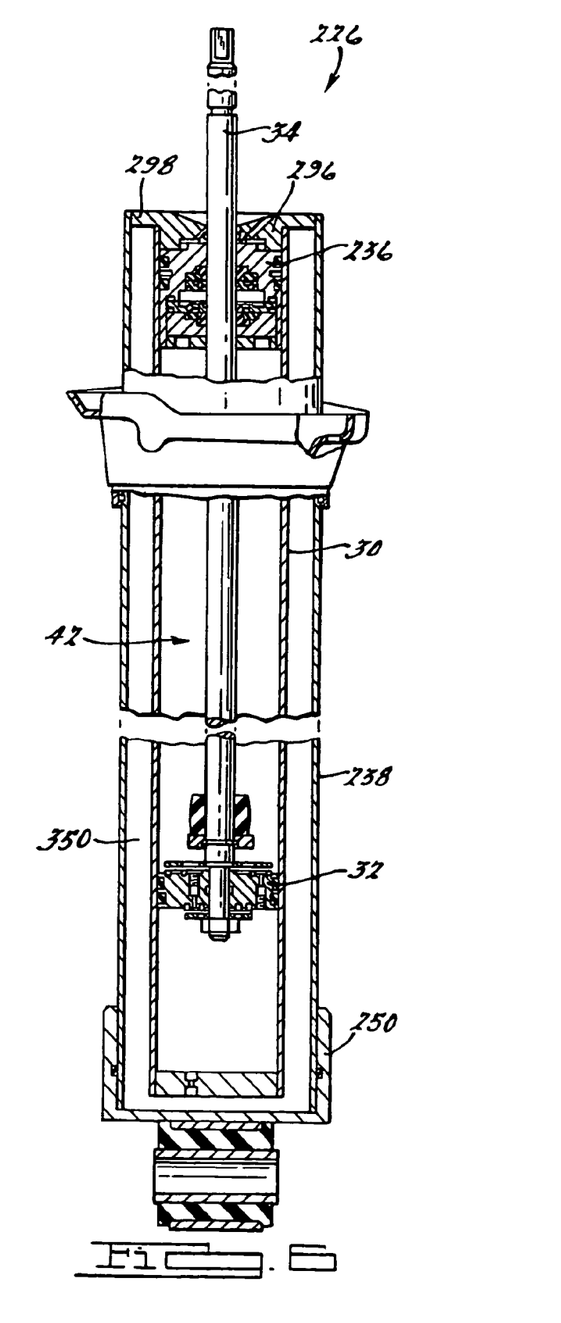
FIG. 5 is an enlarged cross-sectional view of a piston assembly in accordance with another embodiment of the present invention.

Referring now to FIG. 5, a piston assembly 32' is illustrated. Piston assembly 32' is designed to be a direct replacement for piston assembly 32. Piston assembly 32' comprises a piston body 52' and a tunable restriction 70'. Tunable restriction 70' replaces passages 70 and 72 of piston assembly 32 and provides communication between upper working chamber 44 and lower working chamber 46. The damping characteristics for a shock absorber 26 which incorporates piston assembly 32' is controlled by the size of tunable restriction 70'. The function, operation and advantages listed above for shock absorber 26 utilizing piston assembly 32 are the same for shock absorber 26 when piston assembly 32' replaces piston assembly 32.

Referring now to FIG. 6, a shock absorber 226 in accordance with another embodiment of the present invention is illustrated. Shock absorber 226 comprises pressure tube 30, piston assembly 32, piston rod 34, a rod guide assembly 236 and a chamber tube 238.

One of the problems associated with shock absorber 26 shown in FIG. 2 is the addition of gas chamber 152 increases the overall length of shock absorber 26 without increasing the available stroke for shock absorber 26. Shock absorber 226 addresses this issue by having chamber tube 238 define a gas chamber 350 which is concentric with working chamber 42 defined by pressure tube 30. In order to accommodate chamber tube 238, rod guide assembly 236 replaces rod guide assembly 36. Rod guide assembly 236 is the same as rod guide assembly 36 except that retainer 96 has been replaced with retainer 296. Retainer 296 is the same as retainer 96 except for having a flanged section 298 which extends radially outward to mate with chamber tube 238 to seal gas chamber 350. In addition, end cap 50 of shock absorber 26 has been replaced with end cap 250. End cap 250 is the same as end cap 50 except that end cap 250 extends radially outward to mate with chamber tube 238 to seal gas chamber 350. The function, operation and advantages for shock absorber 226 are the same as those listed above for shock absorber 26.

Figure 7:
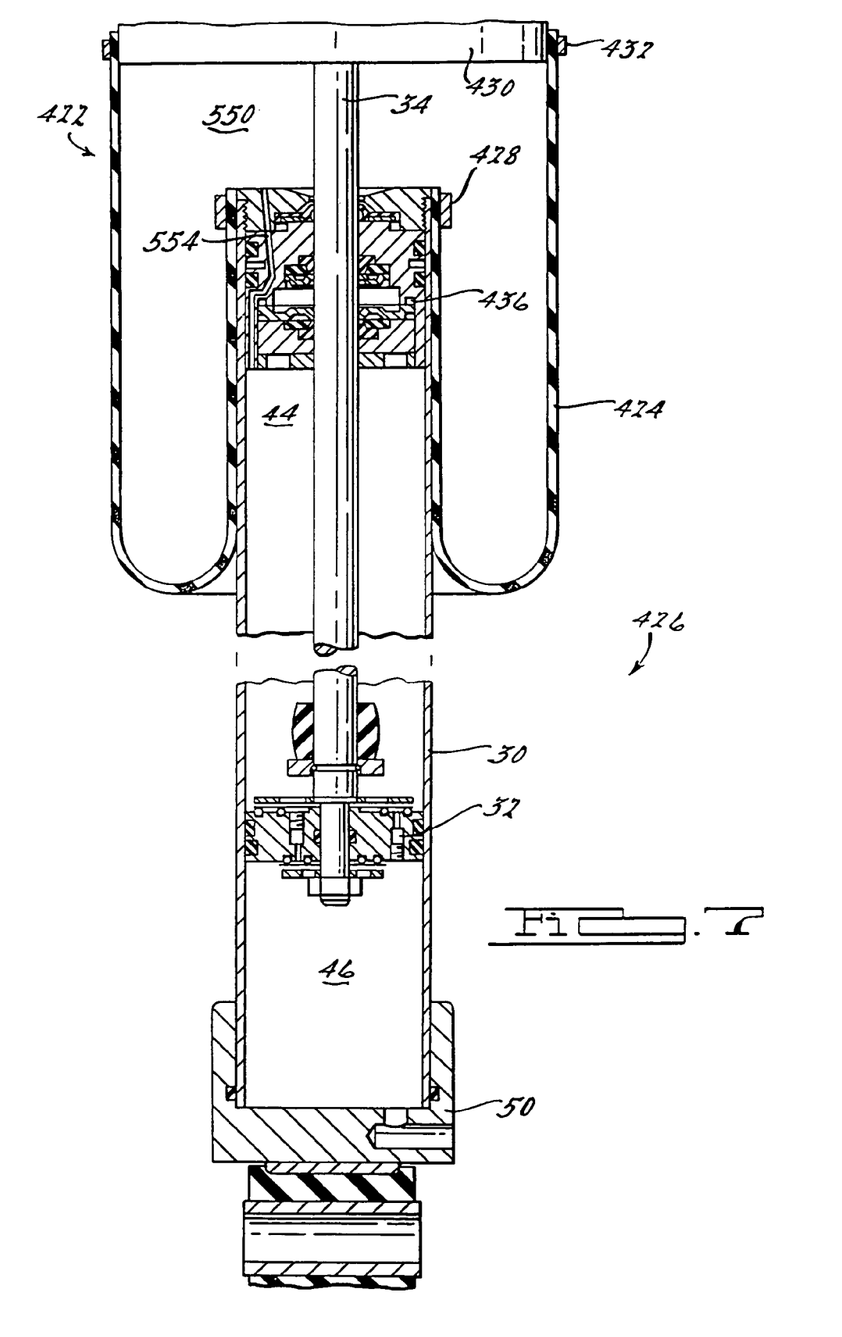
FIG. 7 is a side view, partially in cross-section, of a unique gas filled frequency dependent damper in conjunction with an air spring in accordance with another embodiment of the present invention.

Referring now to FIG. 7, a shock absorber 426 in accordance with another embodiment of the present invention is illustrated. Shock absorber 426 comprises pressure tube 30, piston assembly 32, piston rod 34 and a rod guide assembly 436.

When vehicle 10 includes an air spring assembly 422 in place of coil springs 22 and/or coil springs 28, the volume of the compressed gas can be utilized as a gas chamber 550 in place of chamber 150 or 350 for shock absorber 426.

Air spring assembly 422 comprises a flexible bladder 424 which is secured to shock absorber 426 using a retainer 428 and which is secured to an upper mount assembly 430 by a retainer 432. Bladder 424 defines chamber 550 which contains pressurized gas for supporting body 16 of vehicle 10. In order to utilize chamber 550 for the tuning of shock absorber 426, a tunable restriction 554 needs to be provided through rod guide assembly 436 to allow gas communication between upper working chamber 44 and chamber 550. While not specifically illustrated, rather than provide tunable restriction 554 through rod guide assembly 436, lower working chamber 46 can communicate with chamber 550 through either an exteriorly located or an interiorly located tunable restriction if desired. Rod guide assembly 436 is the same as rod guide assembly 36 with the exception of incorporation tunable restriction 554. The function, operation and advantages of shock absorber 426 are the same as those detailed above for shock absorber 26.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
   a pressure tube;
   a rod guide assembly closing a first end of said pressure tube;
   an end cap closing a second end of said pressure tube, said rod guide assembly, said end cap and an inner cylindrical surface of said pressure tube forming a sealed working chamber, said sealed working chamber being completely filled with a pressurized gas;
   a solid piston rod disposed within said sealed working chamber, said solid piston rod defining a longitudinal axis and having a first end extending through said rod guide assembly;
   a piston disposed within said sealed working chamber, said piston being attached to a second end of said solid piston rod, said piston slidingly engaging said inner cylindrical surface of said pressure tube to divide a first portion of said sealed working chamber into an upper working chamber and a lower working chamber, said upper working chamber and said lower working chamber being completely filled with said pressurized gas;
   a first flow path extending through said piston to accommodate flow of said pressurized gas between said upper working chamber and said lower working chamber;
   a valve body disposed within said sealed working chamber to define with said end cap and with said inner cylindrical surface of said pressure tube a fluid chamber located in a second portion of said sealed working chamber, said fluid chamber being completely filled with said pressurized gas, said valve body being independent from said solid piston rod and fixedly secured to said inner cylindrical surface of said pressure tube; and
   a second flow path extending through said valve body to accommodate flow of said pressurized gas between said lower working chamber and said fluid chamber, said second flow path being a continuously open flow path; wherein
   said pressurized gas within said sealed working chamber being the only component of said damper exerting a force on said piston in a direction generally parallel to the longitudinal axis of said piston rod when said piston is stationary within said pressure tube.

2. The damper according to claim 1, further comprising a compression valve assembly attached to said piston, said compression valve assemble prohibiting fluid flow from said upper working chamber to said lower working chamber.

3. The damper according to claim 2, further comprising an extension valve assembly attached to said piston, said extension valve assembly prohibiting fluid flow from said lower working chamber to said upper working chamber.

4. The damper according to claim 1, wherein said first flow path is an open flow path.

5. The damper according to claim 1 wherein said second flow path is a tunable restriction.

6. The damper according to claim 5 wherein said first flow path is a tunable restriction.

7. The damper according to claim 1 wherein said first flow path is a tunable restriction.

8. The damper according to claim 1, wherein the sealed working chamber does not communicate with an external source of pressurized gas.

9. A damper comprising:
   a pressure tube;
   a rod guide assembly closing a first end of said pressure tube;
   an end cap closing a second end of said pressure tube, said rod guide assembly, said end cap and an inner cylindrical surface of said pressure tube forming a sealed working chamber, said sealed working chamber being completely filled with a pressurized gas;
   a solid piston rod disposed within said sealed working chamber, said solid piston rod having a first end extending through said rod guide assembly;
   a piston disposed within said sealed working chamber, said piston being attached to a second end of said solid piston rod, said piston slidingly engaging said inner cylindrical surface of said pressure tube to divide a first portion of said sealed working chamber into an upper working chamber and a lower working chamber, said upper working chamber and said lower working chamber being completely filled with said pressurized gas;
   a first flow path extending through said piston to accommodate flow of said pressurized gas between said upper working chamber and said lower working chamber;
   a valve body disposed within said sealed working chamber to define with said end cap and with said inner cylindrical surface of said pressure tube a fluid chamber located in a second portion of said sealed working chamber, said fluid chamber being completely filled with said pressurized gas, said valve body being independent from said solid piston rod and fixedly secured to said inner cylindrical surface of said pressure tube; and
   a second flow path extending through said valve body to accommodate flow of said pressurized gas between said lower working chamber and said fluid chamber, said second flow path being a continuously open flow path; wherein
   the pressurized gas is the only biasing member disposed within said lower working chamber.

10. The damper according to claim 9, wherein the pressurized fluid is the only biasing member disposed within said upper working chamber.

11. The damper according to claim 9, wherein the sealed working chamber does not communicate with an external source of pressurized gas.

12. A damper comprising:
    a pressure tube;
    a rod guide assembly closing a first end of said pressure tube;
    an end cap closing a second end of said pressure tube, said rod guide assembly, said end cap and an inner cylindrical surface of said pressure tube forming a sealed working chamber, said sealed working chamber being completely filled with a pressurized gas;

a solid piston rod disposed within said sealed working chamber, said solid piston rod having a first end extending through said rod guide assembly;

a piston disposed within said sealed working chamber, said piston being attached to a second end of said solid piston rod, said piston slidingly engaging said inner cylindrical surface of said pressure tube to divide a first portion of said sealed working chamber into an upper working chamber and a lower working chamber, said upper working chamber and said lower working chamber being completely filled with said pressurized gas;

a first flow path extending through said piston to accommodate flow of said pressurized gas between said upper working chamber and said lower working chamber;

a valve body disposed within said sealed working chamber to define with said end cap and with said inner cylindrical surface of said pressure tube a fluid chamber located in a second portion of said sealed working chamber, said fluid chamber being completely filled with said pressurized gas, said valve body being independent from said solid piston rod and fixedly secured to said inner cylindrical surface of said pressure tube; and a second flow path extending through said valve body to accommodate flow of said pressurized gas between said lower working chamber and said fluid chamber, said second flow path being a continuously open flow path; wherein the pressurized gas is the only biasing member disposed within said upper working chamber.

13. The damper according to claim 12, wherein the sealed working chamber does not communicate with an external source of pressurized gas.

* * * * *